United States Patent
Ogawa

(10) Patent No.: US 11,239,687 B2
(45) Date of Patent: Feb. 1, 2022

(54) CHARGE CONTROL DEVICE

(71) Applicant: HONDA MOTOR CO., LTD., Tokyo (JP)

(72) Inventor: Makoto Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

(21) Appl. No.: 16/804,626

(22) Filed: Feb. 28, 2020

(65) Prior Publication Data

US 2020/0295590 A1   Sep. 17, 2020

(30) Foreign Application Priority Data

Mar. 15, 2019  (JP) .............................. JP2019-048706

(51) Int. Cl.
*H02J 7/35* (2006.01)
*B60L 53/51* (2019.01)
*H02J 7/00* (2006.01)

(52) U.S. Cl.
CPC ............... *H02J 7/35* (2013.01); *B60L 53/51* (2019.02); *H02J 7/00714* (2020.01)

(58) Field of Classification Search
CPC ....................................................... H02J 7/35
USPC ........................................................ 320/101
See application file for complete search history.

(56) References Cited

U.S. PATENT DOCUMENTS

| | | | | |
|---|---|---|---|---|
| 2014/0060100 | A1* | 3/2014 | Bryson | G05B 15/02 62/235.1 |
| 2014/0062191 | A1* | 3/2014 | Bryson | H02J 1/12 307/26 |
| 2014/0062206 | A1* | 3/2014 | Bryson | H02J 3/385 307/80 |
| 2015/0008737 | A1* | 1/2015 | Mao | H02J 7/35 307/22 |
| 2017/0358929 | A1* | 12/2017 | Koeppe | H02J 1/102 |
| 2017/0366038 | A1* | 12/2017 | Qin | H02J 7/35 |
| 2018/0069407 | A1 | 3/2018 | Herrera et al. | |

FOREIGN PATENT DOCUMENTS

| | | |
|---|---|---|
| DE | 10 2012 221 424 | 5/2014 |
| EP | 3 016 237 | 5/2016 |
| JP | 6242006 | 12/2017 |
| WO | 2014/068738 | 5/2014 |

OTHER PUBLICATIONS

European Search Report dated May 18, 2020, 7 pages.

\* cited by examiner

*Primary Examiner* — Jerry D Robbins
(74) *Attorney, Agent, or Firm* — Rankin, Hill & Clark LLP

(57) ABSTRACT

A charge control device capable of charging a battery with electric power generated by a photovoltaic power generator, includes: a setting unit configured to set a control value relating to a magnitude of electric power to be supplied to the battery; and an acquisition unit configured to acquire information relating to an actual supplied electric power supplied to the battery. The setting unit sets a predetermined initial value as the control value and then increases and decreases the control value based on the information acquired by the acquisition unit.

5 Claims, 4 Drawing Sheets

CHARGE CONTROL DEVICE

CROSS-REFERENCE TO RELATED APPLICATION

This application claims priority to and the benefit of Japanese Patent Application No. 2019-048706 filed on Mar. 15, 2019, the entire disclosure of which is incorporated herein by reference.

BACKGROUND OF THE INVENTION

Field of the Invention

The present invention relates to a charge control device.

Description of the Related Art

There is a proposed technique to use electric power generated by a photovoltaic power generator as supplied electric power for charging a battery. For example, Japanese Patent No. 6242006 discloses a device that can charge an in-vehicle battery with electric power generated by a photovoltaic generation device and with grid electric power.

An amount of power generation by the photovoltaic power generator depends on weather and the like, being unstable, and a magnitude of the amount of power generation is difficult to determine unless the generated electric power is consumed by a load. When the battery is charged with the electric power generation by the photovoltaic power generator without supplied electric power from the grid electric power due to a power failure or the like, a system down may occur if the amount of power generation by the photovoltaic power generator is significantly small against control details on a battery side for charging electric power.

SUMMARY OF THE INVENTION

An objective of the present invention is to provide a technique to enable a battery to be charged in accordance with an amount of power generation by a photovoltaic power generator.

According to an aspect of the present invention, there is provided a charge control device capable of charging a battery with electric power generated by a photovoltaic power generator, the charge control device comprising: a setting unit configured to set a control value relating to a magnitude of electric power to be supplied to the battery; and an acquisition unit configured to acquire information relating to an actual supplied electric power supplied to the battery, wherein the setting unit sets a predetermined initial value as the control value and then increases and decreases the control value based on the information acquired by the acquisition unit.

Further features of the present invention will become apparent from the following description of exemplary embodiments (with reference to the attached drawings).

DESCRIPTION OF THE EMBODIMENTS

Figure 1:
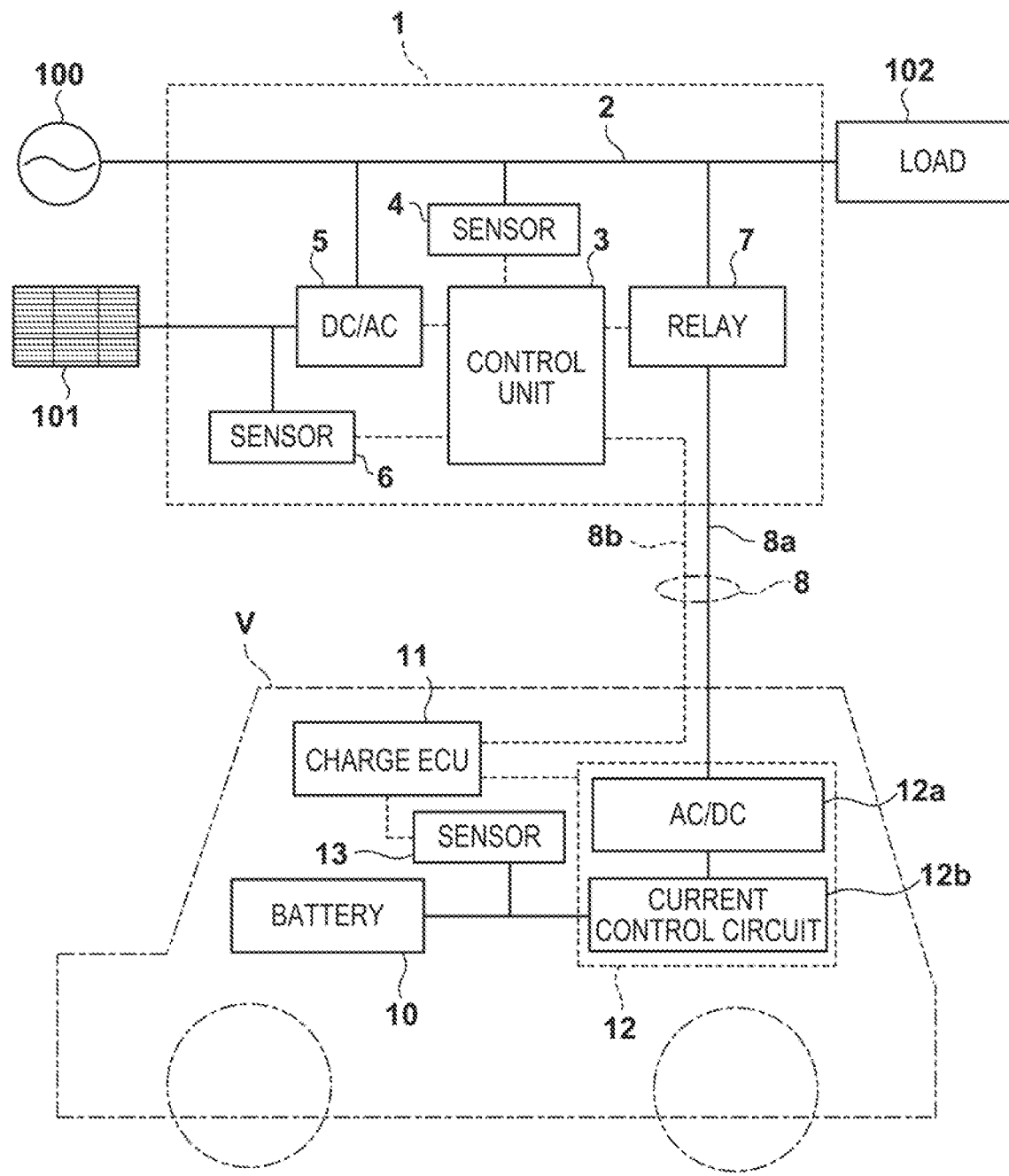
FIG. 1 is a block diagram of a charge control device according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Configuration of Device>

FIG. 1 is a block diagram of a charge control device 1 according to an embodiment of the present invention. The diagram illustrates an example in which the charge control device 1 charges an in-vehicle battery 10 of a vehicle V. The vehicle V is, for example, an electric vehicle (EV) or a plug-in hybrid vehicle (PHEV), and the battery 10 is, for example, a lithium ion battery.

The charge control device 1 is one that constitutes, for example, an electric power management device installed in a house but may be one that constitutes a commercial electric power management device installed in a charging station. The charge control device 1 includes an electric power line 2 that is supplied with AC power from an electric power system 100 being electric power supply facilities of an electric power company or the like.

To the electric power line 2, a load 102 such as a home appliance can be connected, and the AC power of the electric power line 2 is supplied to the load 102. In addition, an external cable 8 is connected to the electric power line 2 via a relay 7. The external cable 8 is an electric power transmission cable that is detachably connectable to the vehicle V. The external cable 8 includes an electric power line 8a transmitting the AC power and a communication line 8b, and the relay 7 connects the electric power line 2 to the electric power line 8a and disconnects the electric power line 2 from the electric power line 8a.

To the charge control device 1, a photovoltaic power generator 101 is connected. The photovoltaic power generator 101 includes a photovoltaic panel and generates DC power. The charge control device 1 includes a DC/AC converter 5. The DC/AC converter 5 converts the DC power generated by the photovoltaic power generator 101 into AC power and outputs the AC power to the electric power line 2.

The charge control device 1 includes a control unit 3. The control unit 3 includes a processor, typically a CPU, a storage device such as a semiconductor memory, an input-output interface for an external device, a communication interface, and the like. The storage device stores a program to be executed by the processor and data to be used by the processor for processing.

The control unit 3 controls the DC/AC converter 5 and the relay 7. In addition, the control unit 3 acquires sensing results from a sensor 4 and a sensor 6. The sensor 4 is a sensor that senses a physical quantity relating to electric power of the electric power line 2, and in the present embodiment, the sensor 4 is a sensor that measures the AC voltage. The sensor 6 is a sensor that senses a physical quantity relating to electric power generated by the photovoltaic power generator 101, and in the present embodiment, the sensor 6 is a sensor that measures the DC voltage generated by the photovoltaic power generator 101. To the control unit 3, the communication line 8b is connected, and when the external cable 8 is connected to the vehicle V, the control unit 3 can communicate with a charge ECU 11 of the vehicle V.

The vehicle V includes the charge ECU 11, a battery charger 12, and a sensor 13, as a configuration relating to the battery 10. The charge ECU 11 includes a processor, typically a CPU, a storage device such as a semiconductor memory, an input-output interface for an external device, a communication interface, and the like. The storage device stores a program to be executed by the processor and data to be used by the processor for processing. The charge ECU 11 controls the battery charger 12. In addition, the charge ECU 11 acquires a sensing result from the sensor 13. The sensor 13 is a sensor that measures DC current supplied from the battery charger 12 to the battery 10.

The battery charger 12 includes an AC/DC converter 12a and a current control circuit 12b. The AC/DC converter 12a converts the AC power supplied from the charge control device 1 through the external cable 8 into DC power. The current control circuit 12b is a circuit that supplies DC current output from the AC/DC converter 12a to the battery 10 while controlling the DC current; for example, the current control circuit 12b controls charge current to the battery 10 using PWM control.

Example of Processing

Figure 2:
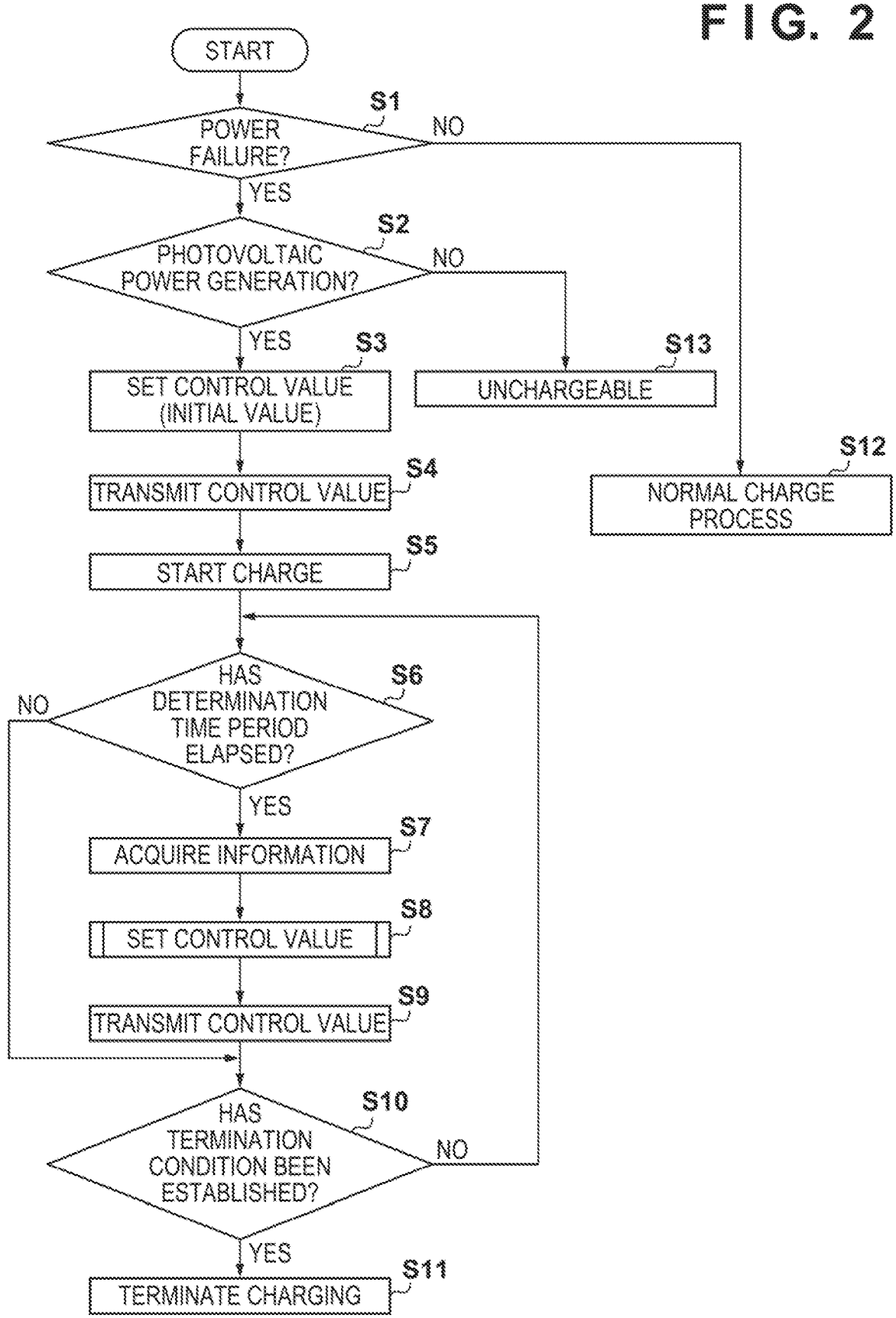
FIG. 2 is a flowchart of an example of processing performed by a control unit of the charge control device illustrated in FIG. 1.

FIG. 2 is a flowchart of an example of processing performed by the control unit 3. The illustrated example shows an example of the processing performed by the control unit 3 in a case where a request to charge the battery 10 is made by a user or the charge ECU 11, with the external cable 8 connected to the vehicle V.

In S1, in response to a sensing result from the sensor 4, the control unit 3 determines whether a power failure is occurring in the electric power system 100. For example, it is determined that a power failure is occurring in a case where the sensor 4 senses that a power grid voltage on the electric power line 2 disappears (in a case where the AC voltage falls below 200 V in Japan).

When it is determined that no power failure is occurring, the control unit 3 proceeds the processing to S12 to perform a normal charge process. In S12, the control unit 3 connects the electric power line 2 to the electric power line 8a using the relay 7 and performs a process of charging the battery 10 using electric power from the electric power system 100. The charge current to the battery 10 is regulated by the charge ECU 11 controlling the current control circuit 12b; for example, the charge current is regulated to 15 A at a start of the charging.

When it is determined that a power failure is occurring, the control unit 3 proceeds the processing to S2. In S2, in response to a sensing result from the sensor 6, the control unit 3 determines whether the photovoltaic power generator 101 is performing electric power generation that allows the charging of the battery 10. For example, it is determined that the charging is allowed when an output voltage (DC) of the photovoltaic power generator 101 sensed by the sensor 6 is 170 V or higher.

When it is determined that the charging is allowed, the control unit 3 proceeds the processing to S3, or when it is determined that the charging is not allowed, the control unit 3 proceeds the processing to S13. In S13, the control unit 3 performs a process relating to an unchargeable state. For example, the control unit 3 notifies the user of the unchargeable state. Alternatively, the control unit 3 notifies the charge ECU 11 of the unchargeable state.

In S3 to S10, the control unit 3 performs a process of charging the battery 10 using only the photovoltaic power generator 101 as an electric power supply source. An amount of power generation by the photovoltaic power generator 101 depends on weather and the like, being unstable. The amount of power generation is difficult to determine unless the generated electric power is actually consumed by a load. When the charging of the battery 10 is controlled as in the normal charge process in S12, a system down may occur if the amount of power generation by the photovoltaic power generator 101 is significantly small. Hence, in the present embodiment, electric power to be supplied to the battery 10 is controlled in accordance with the amount of power generation by the photovoltaic power generator 101. This enables the charging of the battery 10 while avoiding the system down.

In S3, the control unit 3 sets an initial value of a control value relating to a magnitude of electric power to be supplied to the battery. In the present embodiment, the control value is a command value for the charge current to the charge ECU 11 and is a current control value. The initial value is a value that is predetermined so that the system down does not occur even if the amount of power generation by the photovoltaic power generator 101 is insufficient to supply a charge current with the initial value, and the initial value is set to be lower than a value of initial charge current in the normal charge process (S12) (e.g., 2 A). The initial value may be a minimum value of the command value for the charge current to the charge ECU 11.

In S4, the control unit 3 transmits the control value (initial value) set in S3 to the charge ECU 11 through the communication line 8b, and the charge ECU 11 receives the control value. In S5, the control unit 3 performs a process of starting the charging of the battery 10. Here, the control unit 3 controls the relay 7 to connect the electric power line 2 to the electric power line 8a, enabling the charger 12 to be supplied with electric power that is generated by the photovoltaic power generator 101 and supplied to the electric power line 2 by the DC/AC converter 5. In addition, the control unit 3 gives instructions to start the charging to the charge ECU 11 through the communication line 8b. The charge ECU 11 controls the battery charger 12 so that the battery 10 is supplied with electric power at a current value indicated by the received control value.

In S6, the control unit 3 determines whether a determination time period has elapsed. The determination time period can be kept by a software timer running in another routine, and starts of keeping the determination time period are a time of starting the charging in S5 and a time of transmitting the control value in S9 to be described below. The determination time period is predetermined with consideration given to a time period during which a charge state of the battery 10 reaches a steady state in accordance with the set control value (S3, and S8 to be described below); for example, the determination time period is a time period ranging from 5 to 10 seconds. When it is determined that the determination time period has elapsed, the control unit 3 proceeds the processing to S7, or when it is determined that the determination time period has not elapsed, the control unit 3 proceeds the processing to S10.

In S7, the control unit 3 acquires information relating to an actual supplied electric power supplied to the battery 10.

In the present embodiment, the control unit 3 communicates with the charge ECU 11 to acquire information that indicates an actual charge current supplied to the battery 10 from the charge ECU 11. More specifically, the control unit 3 communicates with and requests the charge ECU 11 to acquire and transmit a sensing result from the sensor 13. In response to this request, the charge ECU 11 transmits the sensing result from the sensor 13 to the control unit 3. Based on the sensing result received, the control unit 3 recognizes the actual charge current supplied to the battery 10.

Figure 3:
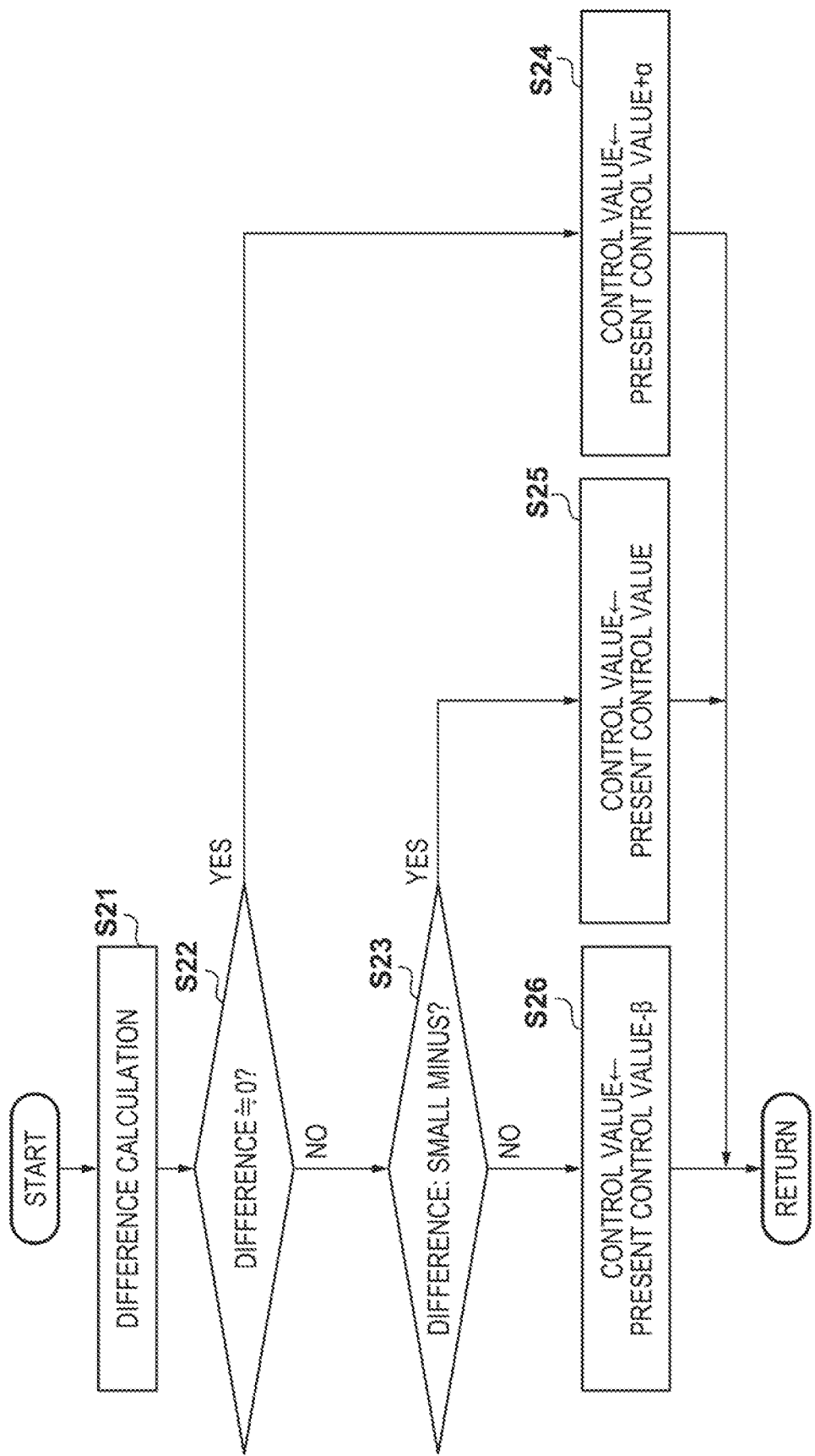
FIG. 3 is a flowchart of the example of the processing performed by the control unit of the charge control device illustrated in FIG. 1.

In S8, based on the information acquired in S7, the control unit 3 updates the control value of which the initial value is set in S3. FIG. 3 is a flowchart illustrating an example of a process of S8. In S21, the control unit 3 calculates a difference between a present control value and an actual charge current value that is acquired in S7 (here, the difference=the actual charge current value−the control value). In S22, the control unit 3 determines whether the difference calculated in S21 falls within a range within which the difference can be considered to be zero (e.g., ±0.05 A), and in a case where the difference can be considered to be zero, the control unit 3 proceeds the processing to S24, or to S23 otherwise.

In S24, the amount of power generation by the photovoltaic power generator 101 is considered to leave a margin for supply of charge current higher than the charge current in accordance with the set control value, and the control unit 3 increases the charge current. Specifically, the control unit 3 updates a control value with a value obtained by adding a given value α (e.g., 2 A) to the present control value.

In S23, the control unit 3 determines whether the difference calculated in S21 falls within a range of values that are slightly lower (e.g., −0.05 A to −0.3 A), and in a case where the difference falls within the lower range of values, the control unit 3 proceeds the processing to S25. Otherwise (in a case where the difference falls within a still lower range (<−0.3 A)), the control unit 3 proceeds the processing to S26.

In S25, considering the amount of power generation by the photovoltaic power generator 101 to be just sufficient for supply of the charge current in accordance with the set control value, the control unit 3 maintains the present control value.

In S26, considering the amount of power generation by the photovoltaic power generator 101 to be insufficient for the supply of the charge current in accordance with the set control value, the control unit 3 decreases the charge current. Specifically, the control unit 3 updates the control value with a value obtained by subtracting a given value β (e.g., 1 A) from the present control value. The set value is updated in the above manner. Note that α in S24 and 13 in S26 may be either the same value or values different from each other.

Referring back to FIG. 2, in S9, the control unit 3 transmits the control value set in S8 to the charge ECU 11 through the communication line 8b. The charge ECU 11 receives the control value and controls the battery charger 12 so that the battery 10 is supplied with electric power at a current value indicated by the received control value.

In S10, the control unit 3 determines whether a termination condition of the charging has been established. Examples of the termination condition of the charging include the following cases: where the user gives instructions to terminate the charging; where the charge ECU 11 gives notice of a full charge; and where the difference calculated in S21 indicates an insufficient amount of power generation when the control value set in S8 reaches its minimum value. When it is determined that the termination condition has been established, the control unit 3 proceeds the processing to S11, or when it is determined that the termination condition has not been established, the control unit 3 proceeds the processing to S6 to repeat the same processes.

In S11, the control unit 3 performs a process relating to terminating the charging. Here, the control unit 3 instructs the charge ECU 11 to terminate the charging and disconnects the connection between the electric power line 2 and the electric power line 8a using the relay 7.

The processing is terminated in the above manner. By repeating the processes of S6 to S9, the set control value is increased and decreased in accordance with the amount of power generation by the photovoltaic power generator 101, that is, the charge current is increased and decreased. This enables the charging of the battery 10 while avoiding the system down. Note that the charge ECU 11 may perform control to decrease the charge current to below the set control value as the charging progresses; in this case, the charge ECU 11 gives a notice of details of the control to the control unit 3, and the control unit 3 may maintain or decrease the set control value.

Other Embodiments

Figure 4:
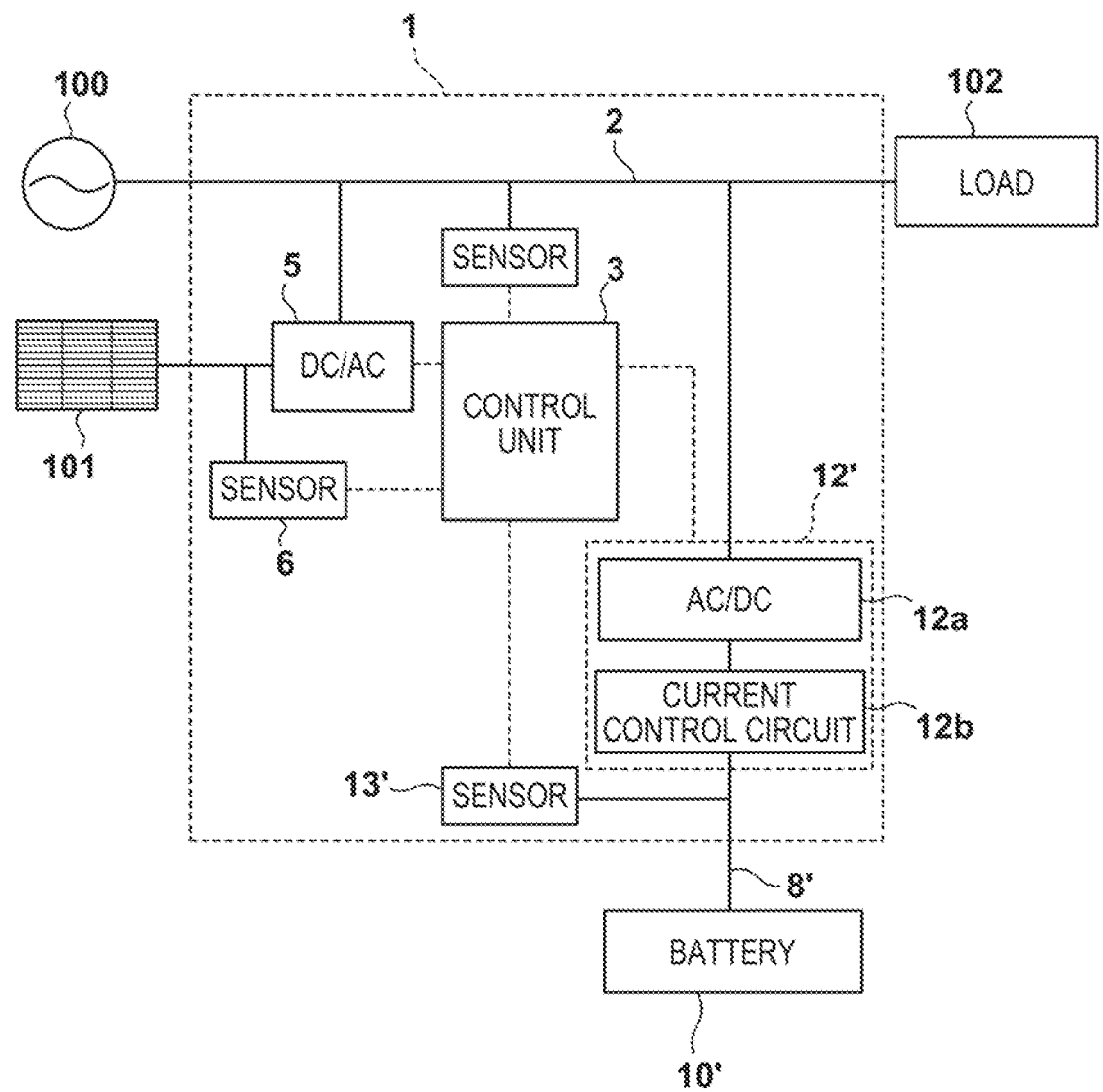
FIG. 4 is a block diagram of a charge control device according to another embodiment.

In the embodiment described above, the battery charger 12 provided in the vehicle V is used to charge the battery 10, but the battery charger may be provided in the charge control device 1. FIG. 4 is a block diagram illustrating an example of the above. A charge control device 1 according to an embodiment illustrated in FIG. 4 has a configuration that includes a battery charger 12' corresponding to the battery charger 12 and a sensor 13' corresponding to the sensor 13 and in which a battery 10' is charged through a wiring 8'. The battery charger 12' is controlled by a control unit 3. Processing relating to charging of the battery 10' performed by the control unit 3 in the embodiment illustrated in FIG. 4 is basically similar to the processing illustrated in FIG. 2 and FIG. 3, the process of transmitting the control value in S4 and S9 is replaced with control performed on the battery charger 12', and in the acquisition of the information in S7, a sensing result is directly acquired from the sensor 13'.

In addition, in the embodiment described above, the charge control device 1 is described as a device that can be fed with electric power from the electric power system 100, but the charge control device 1 may be configured as a device that is not fed with electric power from the electric power system 100 and includes only the photovoltaic power generator 101 as its electric power supply source. In this case, a possible configuration is such that performs the processes of S2 to S11 illustrated in FIG. 2 in charging of the battery.

Summary of Embodiments

The embodiments disclose at least the following embodiments.

1. The charge control device (e.g., 1) in the embodiment described above is a charge control device capable of charging a battery (e.g., 10, 10') with electric power generated by a photovoltaic power generator (e.g., 101), the charge control device including:

a setting unit (e.g., 3, S3, S8) configured to set a control value relating to a magnitude of electric power to be supplied to the battery; and an acquisition unit (e.g., 3, S7) configured to acquire information relating to an actual supplied electric power supplied to the battery, wherein the setting unit sets a predetermined initial value as the control value and then increases and decreases the control value based on the information acquired by the acquisition unit.

The present embodiment can provide the technique to enable the battery to be charged in accordance with an amount of power generation by the photovoltaic power generator, by increasing and decreasing the control value while monitoring an actual supply condition of the electric power to the battery.

2. In the embodiment described above, the charge control device is capable of charging the battery with electric power generated by the photovoltaic power generator and with electric power supplied from an electric power system (e.g., 100) and further includes a determination unit (e.g., 3, S1) configured to determine whether a power failure occurs in the electric power system, and the setting unit sets the control value in a case where the determination unit determines that the power failure occurs.

The present embodiment can charge the battery using the photovoltaic power generator during the power failure.

3. In the embodiment described above, the battery is an in-vehicle battery (e.g., 10), the acquisition unit communicates with a control unit (e.g., 11) of a vehicle (e.g., V) equipped with the battery to acquire the information from the control unit, and the setting unit communicates with and instructs the control unit of the vehicle to perform charging using the control value (e.g., 3, S4, S9).

The present embodiment can charge the in-vehicle battery using the photovoltaic power generator while cooperating with the vehicle.

4. In the embodiment described above, the control value is a current control value, and the information is information indicating an actual charge current value.

The present embodiment can charge the battery by controlling charge current in accordance with the amount of power generation by the photovoltaic power generator.

5. In the embodiment described above, the setting unit increases the current control value in a case where a value obtained by subtracting the current control value from the actual charge current value falls within a first range (e.g., S22, S24), maintains the current control value without increasing or decreasing the current control value in a case where a difference between the current control value and the actual charge current value falls within a second range that is a range of values lower than the first range (e.g., S23, S25), and decreases the current control value in a case where the difference between the current control value and the actual charge current value falls within a third range that is a range of values lower than the second range (e.g., S23, S26).

The present embodiment can increase and decrease the charge current in accordance with the amount of power generation by the photovoltaic power generator, enabling the battery to be charged in a shorter time while avoiding the system down.

The invention is not limited to the foregoing embodiments, and various variations/changes are possible within the spirit of the invention.

What is claimed is:

1. A charge control device capable of charging a battery with electric power generated by a photovoltaic power generator, the charge control device comprising:
   a setting unit configured to set a control value relating to a magnitude of electric power to be supplied to the battery; and
   an acquisition unit configured to acquire information relating to an actual supplied electric power supplied to the battery, wherein
   the setting unit sets a predetermined initial value as the control value and then increases and decreases the control value based on the information acquired by the acquisition unit.

2. The charge control device according to claim 1, wherein
   the charge control device is capable of charging the battery with electric power generated by the photovoltaic power generator and with electric power supplied from an electric power system and
   further comprises a determination unit configured to determine whether a power failure occurs in the electric power system, and
   the setting unit sets the control value in a case where the determination unit determines that the power failure occurs.

3. The charge control device according to claim 1, wherein
   the battery is an in-vehicle battery,
   the acquisition unit communicates with a control unit of a vehicle equipped with the battery to acquire the information from the control unit, and
   the setting unit communicates with and instructs the control unit of the vehicle to perform charging using the control value.

4. The charge control device according to claim 1, wherein
   the control value is a current control value, and
   the information is information indicating an actual charge current value.

5. The charge control device according to claim 4, wherein
   the setting unit
      increases the current control value in a case where a value obtained by subtracting the current control value from the actual charge current value falls within a first range,
      maintains the current control value without increasing or decreasing the current control value in a case where a difference between the current control value and the actual charge current value falls within a second range that is a range of values lower than the first range, and
      decreases the current control value in a case where the difference between the current control value and the actual charge current value falls within a third range that is a range of values lower than the second range.

* * * * *